United States Patent
Mori et al.

(10) Patent No.: US 9,960,619 B2
(45) Date of Patent: May 1, 2018

(54) BATTERY DEVICE AND BATTERY CONTROL DEVICE

(71) Applicant: Panasonic Intellectual Property Management Co., Ltd., Osaka (JP)

(72) Inventors: Gorou Mori, Osaka (JP); Fumihito Inukai, Kyoto (JP); Toshinobu Nagasawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 454 days.

(21) Appl. No.: 14/616,285

(22) Filed: Feb. 6, 2015

(65) Prior Publication Data

US 2015/0155735 A1 Jun. 4, 2015

Related U.S. Application Data

(63) Continuation of application No. PCT/JP2013/001105, filed on Feb. 26, 2013.

(30) Foreign Application Priority Data

Aug. 10, 2012 (JP) .................. 2012-177882

(51) Int. Cl.
  *H02J 7/00* (2006.01)
  *H01M 10/44* (2006.01)
(52) U.S. Cl.
  CPC .......... *H02J 7/0052* (2013.01); *H01M 10/44* (2013.01); *H02J 7/007* (2013.01); *H02J 7/0054* (2013.01);

(Continued)

(58) Field of Classification Search
  CPC ..................................... H02J 7/0052
  (Continued)

(56) References Cited

U.S. PATENT DOCUMENTS 7,423,410 B2 * 9/2008 Yoshio .................. H02J 7/0029
  320/134
8,115,461 B2 * 2/2012 Yoshio ..................... G05F 1/56
  323/266

(Continued)

FOREIGN PATENT DOCUMENTS

JP 11-178224 A 7/1999
JP 2002-233134 A 8/2002

(Continued)

OTHER PUBLICATIONS

International Search Report issued in PCT/JP2013/001105, dated May 21, 2013, with partial English translation.

*Primary Examiner* — Richard V Muralidar
(74) *Attorney, Agent, or Firm* — McDermott Will & Emery LLP (57) ABSTRACT

A battery device includes: a secondary battery; a charger; a first transistor configured to control conduction between the secondary battery and a load; a second transistor configured to control conduction between the charger and the secondary battery; diodes of which cathodes are connected to each other and that are connected between the secondary battery and the charger; a capacitor configured to accumulate charge to be transferred to the gate of the first transistor; a capacitor configured to accumulate charge to be transferred to the gate of the second transistor; and a battery control device configured to control charging/discharging of the secondary battery.

7 Claims, 4 Drawing Sheets

(52) U.S. Cl.
CPC ..... *H02J 7/0068* (2013.01); *H02J 2007/0059* (2013.01)

(58) Field of Classification Search
USPC ........................................ 320/127, 128, 137
See application file for complete search history.

(56) References Cited

U.S. PATENT DOCUMENTS

| | | | |
|---|---|---|---|
| 9,118,326 B2 * | 8/2015 | Mitani | .................. H02J 7/0031 |
| 2002/0130704 A1 | 9/2002 | Myono et al. | |
| 2005/0116764 A1 | 6/2005 | Nagai et al. | |
| 2006/0255768 A1 * | 11/2006 | Yoshio | .................. H02J 7/0029 |
| | | | 320/134 |
| 2008/0100272 A1 | 5/2008 | Yoshio | |
| 2014/0354232 A1 * | 12/2014 | Carcouet | ............... H01M 2/202 |
| | | | 320/118 |

FOREIGN PATENT DOCUMENTS

| | | |
|---|---|---|
| JP | 2008-099370 A | 4/2008 |
| JP | 2011-097767 A | 5/2011 |

\* cited by examiner

BATTERY DEVICE AND BATTERY CONTROL DEVICE

CROSS-REFERENCE TO RELATED APPLICATIONS

This is a continuation of International Application No. PCT/JP2013/001105 filed on Feb. 26, 2013, which claims priority to Japanese Patent Application No. 2012-177882 filed on Aug. 10, 2012. The entire disclosures of these applications are incorporated by reference herein.

BACKGROUND

The present disclosure relates to control of a battery device having a secondary battery, and more particularly to an electric power saving technology in control of charging and discharging of the secondary battery and a technology on productivity and expandability.

In recent years, the use of battery devices each having a battery pack of a secondary battery such as a lithium-ion battery inside is expanding to a wide range from portable equipment to batteries of electric vehicles and motor-operated bicycles.

One of performance capabilities required for such battery devices having a rechargeable secondary battery is low power consumption during charging/discharging of the battery. Also, in development of such battery devices, not only reduction in power consumption but also simplification and expandability of individual components are required.

For reduction in the power consumption of a control device in a battery pack, a technology is known where the power supply voltage used for analog circuits and logic circuits in the battery control device is reduced by lowering voltages supplied from an external secondary battery and an external charger, as disclosed in FIG. 1, etc. of Japanese Unexamined Patent Publication No. 2008-99370 (Patent Document 2), for example.

In a battery charging device in Japanese Unexamined Patent Publication No. 2002-233134 (Patent Document 1), a high-voltage PMOS transistor is used as a control switch for charging/discharging, and the voltage for driving this PMOS transistor is supplied from a battery back and a charger. However, since circuit elements in a battery device do not require a voltage as high as the battery voltage, a charge-pumping step-down circuit is provided in the battery device to reduce the power consumption of the inner circuits.

In the case of using a high-voltage NMOS transistor as a control switch for charging/discharging, it is required to boost the gate voltage of the NMOS transistor by a charge pump circuit like one shown in FIG. 1, etc. of Patent Document 2.

SUMMARY

In the battery charging device disclosed in Patent Document 1, a high-voltage PMOS transistor is used as a charging/discharging switch. High-voltage PMOS transistors are however inferior in characteristics to high-voltage NMOS transistors. In particular, high-voltage NMOS transistors, superior in transistor ON resistance and switching speed, are also more advantageous than high-voltage PMOS transistors from the standpoint of cost.

However, using a high-voltage NMOS transistor as a charging/discharging switch, it is required to boost the gate voltage with a charge pump circuit as one disclosed in Patent Document 2, and this will cause a problem of increasing power consumption due to pulse-dependent operation.

On the other hand, while a voltage drop from a charging/discharging voltage by a threshold voltage Vth occurs when an NMOS transistor is used as a charging/discharging switch, this voltage drop does not occur when a high-voltage PMOS transistor is used as a charging/discharging switch. This is an advantage in using a high-voltage PMOS transistor. Therefore, if NMOS and PMOS transistors can be used without the necessity of changing the inner control configuration of the device, it will be advantageous in productivity and expandability. However, it is difficult to use a high-voltage NMOS transistor for charging/discharging in the charging device in Patent Document 1 without changing the inner circuits of the device.

In view of the above, an objective of the present disclosure is providing a battery device where the power consumption is reduced and the productivity and expandability of the system of a control device are improved.

To attain the above objective, the battery device according to the disclosure includes: a secondary battery configured to supply a current to a load; a charger configured to charge the secondary battery; a first NMOS transistor configured to control conduction of a current path from the charger to the secondary battery; a second NMOS transistor configured to control conduction of a current path from the secondary battery to the load; a first diode of which an anode is connected to one end of the secondary battery; a second diode of which an anode is connected to one end of the charger and a cathode is connected to a cathode of the first diode; a first capacitor configured to accumulate charge to be transferred to a gate of the first NMOS transistor; a second capacitor configured to accumulate charge to be transferred to a gate of the second NMOS transistor; and a battery control device configured to control charging/discharging of the secondary battery by controlling the accumulation of charge into the first and second capacitors and the transfer of the charge to the gates of the first and second NMOS transistors.

Alternatively, the battery device according to the disclosure includes: a secondary battery configured to supply a current to a load; a charger configured to charge the secondary battery; a first PMOS transistor configured to control conduction of a current path from the secondary battery to the load; a second PMOS transistor configured to control conduction of a current path from the charger to the secondary battery; a first diode of which an anode is connected to one end of the secondary battery; a second diode of which an anode is connected to one end of the charger and a cathode is connected to a cathode of the first diode; and a battery control device configured to control charging/discharging of the secondary battery by controlling voltages supplied to gates of the first and second PMOS transistors.

According to the disclosure, the power consumption, productivity, and expandability of the battery device can be improved compared with those of the conventional ones.

DETAILED DESCRIPTION

First Embodiment

Figure 1:
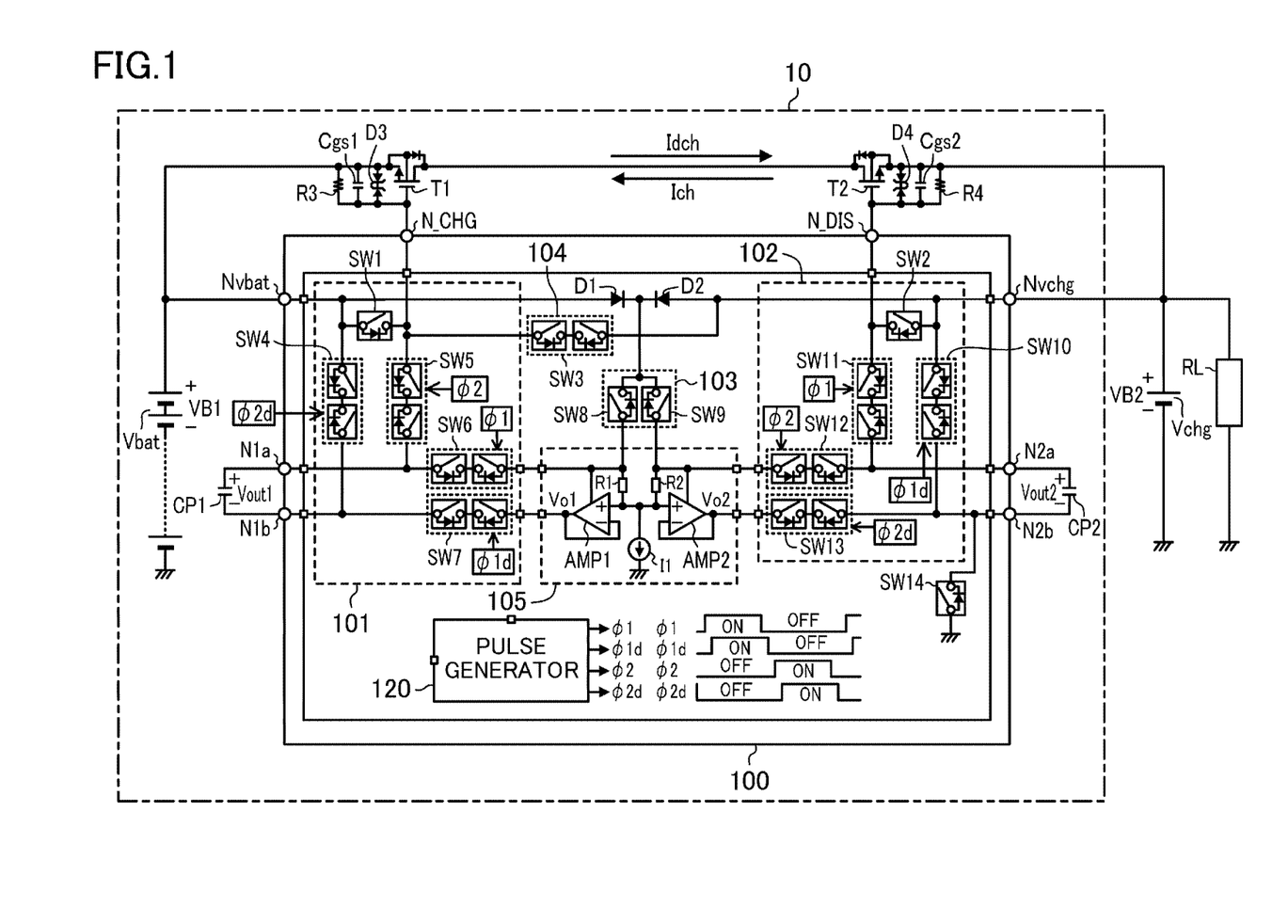
FIG. 1 is a block diagram showing a configuration of a battery device of the first embodiment.

FIG. 1 is a block diagram showing a configuration of a battery device of the first embodiment. In the battery device 10 shown in FIG. 1, a secondary battery Vbat is charged by a charger Vchg, and a current is supplied from the secondary battery Vbat to a drive load RL. The battery device 10 includes: a first high-voltage NMOS transistor T1 (hereinafter referred to as a transistor T1); a second high-voltage NMOS transistor T2 (hereinafter referred to as a transistor T2); the secondary battery Vbat having a voltage value of VB1; first and second capacitors CP1 and CP2; the charger Vchg having a voltage value of VB2; and a battery control device 100.

The transistor T1, connected between the secondary battery Vbat and the charger Vchg, controls the conduction of a current path from the charger Vchg to the secondary battery Vbat. The transistor T2, connected between the secondary battery Vbat and the charger Vchg, controls the conduction of a current path from the secondary battery Vbat to the drive load RL.

A resistance element R3 for discharging the gate voltage is connected between the gate and source of the transistor T1. A resistance element R4 for discharging the gate voltage is connected between the gate and source of the transistor T2. A parasitic capacitance Cgs1 is present between the gate and source of the transistor T1, and a parasitic capacitance Cgs2 is present between the gate and source of the transistor T2. Also, diodes D3 and D4 are respectively provided for protecting the gates of the transistors T1 and T2 from a transient large current.

Charge for boosting the gate voltage of the transistor T1 by charge pumping is accumulated in the capacitor CP1. Charge for boosting the gate voltage of the transistor T2 by charge pumping is accumulated in the capacitor CP2.

The battery control device 100 includes: a terminal Nvbat connected to the secondary battery Vbat; a terminal Nvchg connected to the charger Vchg and the drive load RL driven with the battery device 10; a terminal N_CHG connected to the transistor T1 that operates at a time when the drive load RL is driven with the secondary battery Vbat; and a terminal N_DIS connected to the transistor T2 that operates at a time when the secondary battery Vbat is charged; terminals N1$a$ and N1$b$ connected to the capacitor CP1; and terminals N2$a$ and N2$b$ connected to the capacitor CP2.

The battery control device 100 includes, between the terminal Nvbat and the terminal Nvchg, a first diode D1 of which the anode is connected to the terminal Nvbat and a second diode D2 of which the anode is connected to the terminal Nvchg. The cathodes of the first and second diodes D1 and D2 are connected to each other, to prevent backflow of a current between the terminal Nvbat and the terminal Nvchg.

The battery control device 100 also includes a pulse generator 120 that generates pulses φ1, φ1d, φ2, and φ2d to be described later.

The battery control device 100 further includes: a first switch section 101, a second switch section 102, a third switch section 103 connected between the cathodes of the diodes D1 and D2, and a fourth switch section 104; a switch SW14 connected between the terminal N2$b$ and a ground potential; and a first level shift section 105.

The switch section 101 has switches SW1, SW4, SW5, SW6, and SW7. The switch section 101 performs switching operation for boosting the gate voltage of the transistor T1 when the secondary battery Vbat is charged by the charger Vchg.

The switch section 102 has switches SW2, SW10, SW11, SW12, and SW13. The switch section 102 performs switching operation for boosting the gate voltage of the transistor T2 when a discharge current is supplied from the secondary battery Vbat to the drive load RL to drive the drive load RL.

The switch section 103 has switches SW8 and SW9. The switch section 103 performs switching operation when an operating voltage is given to the level shift section 105 from the secondary battery Vbat or the charger Vchg.

The switch section 104 has a switch SW3. The switch section 104 is a switch for short-circuiting the terminal N_CHG and the terminal Nvchg without via the diodes D1 and D2.

The first level shift section 105 gives boosting voltages Vo1 and Vo2 for boosting the gate voltages of the transistors T1 and T2 to the capacitors CP1 and CP2 that are charge pump capacitors, respectively. In other words, the capacitors CP1 and CP2 are charged with the voltages supplied from the level shift section 105.

The level shift section 105 has a first level shift circuit AMP1 connected to the power supply terminal via the switch SW8 of the switch section 103. The non-inverting input of the level shift circuit AMP1 is connected to the switch SW8 via a resistance element R1 and to one end of a current source I1 (current value I). The other end of the current source I1 is grounded. The inverting input of the level shift circuit AMP1 is connected so that the output of the level shift circuit AMP1 be fed back.

The power supply terminal of the level shift circuit AMP1 is connected to the switch SW6 of the switch section 101, and the output terminal thereof is connected to the switch SW7 of the switch section 101.

The level shift section 105 also has a second level shift circuit AMP2 connected to the power supply terminal via the switch SW9 of the switch section 103. The non-inverting input of the level shift circuit AMP2 is connected to the switch SW9 via a resistance element R2 and to one end of the current source I1. The inverting input of the level shift circuit AMP2 is connected so that the output terminal of the level shift circuit AMP2 be fed back.

The power supply terminal of the level shift circuit AMP2 is connected to the switch SW12 of the switch section 102, and the output terminal thereof is connected to the switch SW13 of the switch section 102.

The pulse generator 120 generates the pulses φ1, φ1d, φ2, and φ2d having waveforms shown in FIG. 1 and outputs the pulses. The pulses φ1, φ1d, φ2, and φ2d are input into the relevant switches as shown in FIG. 1.

In the configuration as described above, when the drive load RL is being driven with the secondary battery Vbat, the charger Vchg is cut off from the terminal Nvchg. When the secondary battery Vbat is charged by the charger Vchg, the drive load RL is kept connected to the terminal Nvchg but configured not to be driven with this connection.

In this embodiment, in order to boost the gate voltages of the transistors T1 and T2 using the charge pump capacitors CP1 and CP2, when the capacitor CP1 is being charged, i.e., when charge is being accumulated in the capacitor CP1, the charge in the capacitor CP2 is transferred to the gate terminal of the transistor T2. Likewise, when the capacitor CP2 is being charged, i.e., when charge is being accumulated in the capacitor CP2, the charge in the capacitor CP1 is transferred to the gate terminal of the transistor T1. In this way, in the transistors T1 and T2 and the capacitors CP1 and CP2, by performing accumulation of charge and transfer of charge alternately, the gate voltages of the transistors T1 and T2 can be boosted.

The operation of the battery device 10 of this embodiment will be described hereinafter.

(1) Operation During Period when Charge is Accumulated in Capacitor CP1 and Charge is Transferred from Capacitor CP2 to Gate of Transistor T2

When the secondary battery Vbat is charged with a charge current Ich from the charger Vchg and when the drive load RL is driven with a discharge current Idch from the secondary battery, all the switches of the switch sections 101, 102, and 104 perform switching operation. In order to charge the secondary battery Vbat, the transistor T1 must be turned on. The source terminal of the transistor T1 is connected to the secondary battery Vbat, and the drain terminal thereof is connected to the drain terminal of the transistor T2. Further, the back gate terminal of the transistor T1 is connected to the source terminal thereof.

Also, the switches SW8 and SW9 that supply the drive voltage to the level shift section 105 for supplying boosted voltages to the gate terminals of the transistors T1 and T2 are kept in the ON state at all times.

In order to turn on the gate of the transistor T1 in the above-described connection state, a voltage equal to or more than the threshold voltage Vth1 of the transistor T1, with reference to the source voltage thereof, must be given to the gate. That is, the gate voltage must be boosted to VB1+Vth1.

For example, when VB1>VB2, the diode D1 is turned on to supply VB1 to the level shift section 105. The level shift section 105 has the level shift circuit AMP1 that boosts the gate voltage of the transistor T1 by charge pumping and the level shift circuit AMP2 that boosts the gate voltage of the transistor T2 by charge pumping. The power supply terminal of the level shift circuit AMP1 is connected between the cathodes of the diodes D1 and D2 via the switch SW8, and the non-inverting input terminal thereof is connected to this power supply terminal via the resistance element R1 and to one end of the current source I1 the other end of which is grounded. The inverting input terminal of the level shift circuit AMP1 is connected so that the output terminal thereof be fed back. In such a configuration, the output voltage Vo1 of the level shift circuit AMP1 can be represented by Vo1=(VB1−R1×I)×Av1/(1+Av1) where Av1 is the voltage amplification factor of the level shift circuit AMP1. By charge-pumping the output voltage Vo1 using the capacitor CP1 and the switch section 101, the capacitor CP1 is charged to VB1−Vo1 (=Vout1).

When VB1<VB2, the diode D2 is turned on to supply VB2 to the level shift section 105. Therefore, the output voltage Vo1 of the level shift circuit AMP1 can be represented by Vo1=(VB2−R1×I)×Av1/(1+Av1). The capacitor CP1 is charged to VB2−Vo1 (=Vout1) by charge pumping.

The charge pumping is performed with the input of the pulses to the switch sections 101 and 102 from the pulse generator 120.

The pulse generator 120 generates four patterns of pulses φ1, φ1d, φ2, and φ2d as in the timing chart shown in FIG. 1. Note that, in order to prevent generation of an inrush current, etc. that may occur when the pulses φ1, φ1d, φ2, and φ2d are simultaneously turned on/off, the timings at which the pulses φ1, φ1d, φ2, and φ2d are logically changed are delayed from one another.

During the period when the capacitor CP1 is charged, the switches SW6 and SW7 are put in the ON state with the pulses φ1 and φ1d, and the switches SW4 and SW5 are put in the OFF state with the pulses φ2 and φ2d. During this period, the switches SW1 and SW3 are kept in the OFF state, and the switches SW8 and SW9 are kept in the ON state. With this setting, the capacitor CP1 is charged with the output voltage Vo1 of the level shift section 105.

During this period, also, the voltage accumulated in the capacitor CP2 is transferred to the gate terminal of the transistor T2 by the switching operation of the switch section 102. That is, the switches SW12 and SW13 are put in the OFF state with the pulses φ2 and φ2d, and the switches SW10 and SW11 are put in the ON state with the pulses φ1 and φ1d, allowing the voltage accumulated in the capacitor CP2 to be transferred to the gate terminal of the transistor T2.

At this time, the level shift circuit AMP2 that supplies a voltage to the capacitor CP2 stops its operation receiving a low power mode signal from a register section (not shown) in the battery device 10.

That is, during the period described above, while the level shift circuit AMP1 is operating, the level shift circuit AMP2 stops its operation, whereby power consumed by the level shift circuit AMP2 can be reduced. Thus, the power consumption of the battery device 10 can be reduced.

(2) Operation During Period when Charge is Accumulated in Capacitor CP2 and Charge is Transferred to Gate Terminal of Transistor T1

When the secondary battery Vbat is charged with the charge current Ich from the charger Vchg and when the drive load RL is driven with the discharge current Idch from the secondary battery Vbat, all the switches of the switch sections 101, 102, and 104 perform switching operation. In order to drive the drive load RL with the secondary battery Vbat, the transistor T2 must be turned on. The source terminal of the transistor T2 is connected to the drive load RL, and the drain terminal thereof is connected to the drain terminal of the transistor T1. Further, the back gate terminal of the transistor T2 is connected to the source terminal thereof.

Also, the switches SW8 and SW9 that supply the drive voltage to the level shift section 105 for supplying boosted voltages to the gate terminals of the transistors T1 and T2 are kept in the ON state at all times.

In order to turn on the gate of the transistor T2 in the above-described connection state, a voltage equal to or more than the threshold voltage Vth2 of the transistor T2, with reference to the source voltage thereof, must be given to the gate. That is, the gate voltage must be boosted to VB2+Vth2.

For example, when VB1>VB2, the diode D1 is turned on to supply VB1 to the level shift section 105. The level shift section 105 has the level shift circuit AMP1 that boosts the gate voltage of the transistor T1 by charge pumping and the level shift circuit AMP2 that boosts the gate voltage of the transistor T2 by charge pumping. The power supply terminal of the level shift circuit AMP2 is connected between the cathodes of the diodes D1 and D2 via the switch SW9, and the non-inverting input terminal thereof is connected to this power supply terminal via the resistance element R2 and to one end of the current source I1 the other end of which is grounded. The inverting input terminal of the level shift circuit AMP2 is connected so as to feed back the output terminal thereof. In such a configuration, the output voltage Vo2 of the level shift circuit AMP2 can be represented by Vo2=(VB1−R2×I)×Av2/(1+Av2) where Av2 is the voltage amplification factor of the level shift circuit AMP2. By charge-pumping the output voltage Vo2 using the charge pump capacitor CP2 and the switch section 102, the capacitor CP2 is charged to VB1−Vo2 (=Vout2).

When VB1<VB2, the diode D2 is turned on to supply VB2 to the level shift section 105. Therefore, the output voltage Vo2 of the level shift circuit AMP2 can be represented by Vo2=(VB2−R2×I)×Av2/(1+Av2). The capacitor CP2 is charged to VB2−Vo2 (=Vout2) by charge pumping.

During the period when the capacitor CP2 is charged, the switches SW12 and SW13 are put in the ON state with the pulses φ2 and φ2d, and the switches SW10 and SW11 are put in the OFF state with the pulses φ1 and φ1d. During this period, the switches SW2 and SW3 are kept in the OFF state, and the switches SW8 and SW9 are kept in the ON state. With this setting, the capacitor CP2 is charged with the output voltage Vo2 of the level shift section 105.

During this period, also, the voltage accumulated in the capacitor CP1 is transferred to the gate terminal of the transistor T1 by the switching operation of the switch section 101. That is, the switches SW4 and SW5 are put in the ON state with the pulses φ2 and φ2d, and the switches SW6 and SW7 are put in the OFF state with the pulses φ1 and φ1d, allowing the voltage accumulated in the capacitor CP1 to be transferred to the gate terminal of the transistor T1.

At this time, the level shift circuit AMP1 that supplies a voltage to the capacitor CP1 stops its operation receiving the low power mode signal from the register section (not shown) in the battery device 10.

That is, during the period described above, while the level shift circuit AMP2 is operating, the level shift circuit AMP1 stops its operation, whereby power consumed by the level shift circuit AMP1 can be reduced. Thus, the power consumption of the battery device 10 can be reduced.

As described above, in the series of operations (1) and (2), the transistors T1 and T2 are in the ON state during the operation of the battery device 10.

(3) Operation During Precharge Period

When the voltage of the charger Vchg is less than the minimum operating voltage of the battery control device 100, e.g., when the voltage VB1 of the secondary battery Vbat has become approximately 0 V, the switch SW3 is turned on. This connects the gate of the transistor T1 to the charger Vchg, permitting the transistor T1 to turn on. The voltage VB1 of the secondary battery Vbat is gradually charged with the voltage VB2 of the charger Vchg via the ON transistor T1 and the body diode of the transistor T2.

(4) Operation During Period when Transistors T1 and T2 are Turned Off (Period when Operation of Battery Device 10 is Stopped)

When the charger Vchg is not driven, such as when the secondary battery Vbat has become its fully charged state by being charged by the charger Vchg and when a voltage large enough for the secondary battery Vbat to drive the drive load RL has been lost during the time when the battery device 10 is driving the drive load RL, the switch SW1 of the switch section 101 and the switch SW2 of the switch section 102 are turned on to turn off the transistors T1 and T2.

By the series of operations described above, the electric power consumed in the level shift circuits AMP1 and AMP2 during the operation of the battery device 10 can be reduced, and thus the power consumption of the battery device 10 can be reduced.

Second Embodiment

Figure 2:
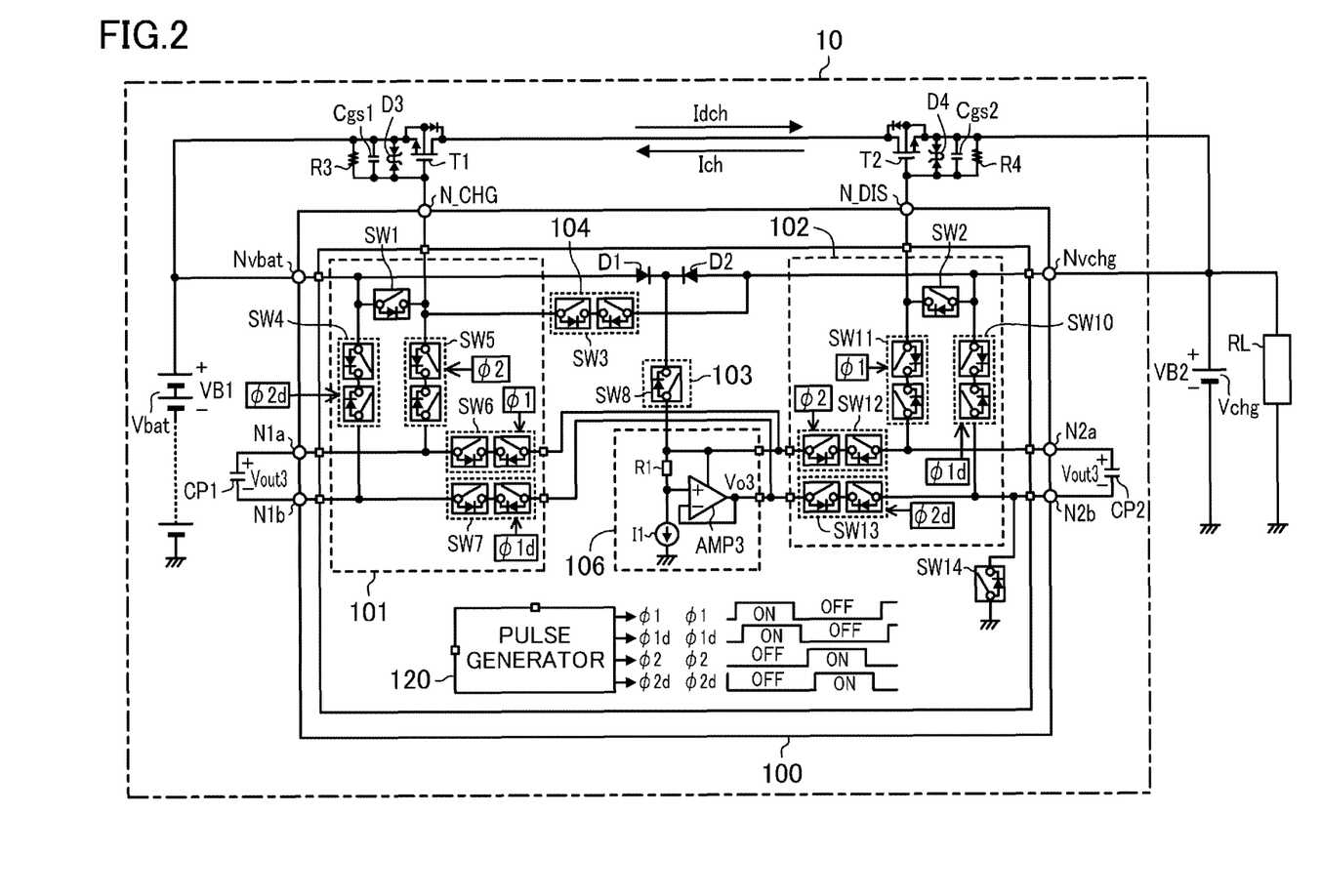
FIG. 2 is a block diagram showing a configuration of a battery device of the second embodiment.

FIG. 2 is a block diagram showing a configuration of a battery device of the second embodiment. Note that the reference characters used in common in the first and second embodiments denote the same components.

The battery device 10 shown in FIG. 2 is different from the battery device 10 shown in FIG. 1 in the configuration of the battery control device 100.

Specifically, in the battery control device 100 in this embodiment, the third switch section 103 has a switch SW8, and a second level shift section 106 is provided.

One end of the switch SW8 is connected between the cathodes of the diodes D1 and D2, and the other end thereof is connected to the level shift section 106.

The level shift section 106 has a third level shift circuit AMP3 connected to the power supply terminal via the switch SW8. The non-inverting input of the level shift circuit AMP3 is connected to the switch SW8 via the resistance element R1 and to the ground potential via the current source I1 (current value I). The inverting input of the level shift circuit AMP3 is connected so as to feed back the output terminal of the level shift circuit AMP3. The power supply terminal of the level shift circuit AMP3 is connected to the switch SW6 of the switch section 101 and to the switch SW12 of the switch section 102, and the output terminal thereof is connected to the switch SW7 of the switch section 101 and to the switch SW13 of the switch section 102.

The operation of the battery device 10 of this embodiment will be described hereinafter.

(1) Operation During Period when Charge is Accumulated in Capacitor CP1 and Charge is Transferred from Capacitor CP2 to Gate of Transistor T2

When the secondary battery Vbat is charged with the charge current Ich from the charger Vchg and when the drive load RL is driven with the discharge current Idch from the secondary battery Vbat, all the switches of the switch sections 101, 102, and 104 perform switching operation. Also, the switch SW8 that supplies the power supply voltage to the level shift section 106 for supplying a boosted voltage to the gate terminals of the transistors T1 and T2 is kept in the ON state at all times.

In order to turn on the gate of the transistor T1 in the above-described connection state, a voltage equal to or more than the threshold voltage Vth1 of the transistor T1, with reference to the voltage at the source terminal thereof, must be given to the gate. That is, the gate terminal must be boosted to VB1+Vth1.

For example, when VB1>VB2, the diode D1 is turned on to supply VB1 to the level shift section 106. In this case, the output voltage Vo3 of the level shift circuit AMP3 can be represented by Vo3=(VB1−R1×I)×Av3/(1+Av3) where Av3 is the voltage amplification factor of the level shift circuit AMP3. By charge-pumping the output voltage Vo3 of the level shift circuit AMP3 using the charge pump capacitor CP1 and the switch section 101, the capacitor CP1 is charged to VB1−Vo3 (=Vout3).

When VB1<VB2, the diode D2 is turned on to supply VB2 to the level shift section 106. Therefore, the output voltage Vo3 of the level shift circuit AMP3 can be represented by Vo3=(VB2−R1×I)×Av3/(1+Av3). The capacitor CP1 is charged to VB2−Vo3 (=Vout3) by charge pumping.

The charge pumping is performed with the input of the pulses to the switch sections 101 and 102 from the pulse generator 120.

During this period, also, the voltage accumulated in the charge pump capacitor CP2 is transferred to the gate terminal of the transistor T2 by the switching operation of the switch section 102. That is, the switches SW12 and SW13 are put in the OFF state with the pulses φ2 and φ2d, and the switches SW10 and SW11 are put in the ON state with the pulses φ1d and φ1, allowing the voltage accumulated in the capacitor CP2 to be transferred to the gate terminal of the transistor T2. At this time, the switch SW2 is put in the OFF state.

(2) Operation During Period when Charge is Accumulated in Capacitor CP2 and Charge is Transferred to Gate Terminal of Transistor T1

When the secondary battery Vbat of the battery device 10 is charged with the charge current Ich from the charger Vchg and when the drive load RL is driven with the discharge current Idch from the secondary battery Vbat, all the switches of the switch sections 101, 102, and 104 perform switching operation. In order to drive the drive load RL with the secondary battery Vbat, the transistor T2 is turned on. To do so, a voltage equal to or more than the threshold voltage Vth2 of the transistor T2, with reference to the voltage at the source terminal of the transistor T2, must be given to the gate. That is, the gate voltage must be boosted to VB2+Vth2.

For example, when VB1>VB2, the diode D1 is turned on to supply VB1 to the level shift section 106. In this case, the output voltage Vo3 of the level shift circuit AMP3 can be represented by Vo3=(VB1−R1×I)×Av3/(1+Av3). By charge-pumping the output voltage Vo3 of the level shift circuit AMP3 using the charge pump capacitor CP2 and the switch section 102, the capacitor CP2 is charged to VB1−Vo3 (=Vout3).

When VB1<VB2, the diode D2 is turned on to supply VB2 to the level shift section 106. Therefore, the output voltage Vo3 of the level shift circuit AMP3 can be represented by Vo3=(VB2−R1×I)×Av3/(1+Av3). The capacitor CP2 is charged to VB2−Vo3 (=Vout3) by charge pumping.

During this period, also the voltage accumulated in the charge pump capacitor CP1 is transferred to the gate terminal of the transistor T1 by the switching operation of the switch section 101. That is, the switches SW4 and SW5 are put in the ON state with the pulses φ2d and φ2, and the switches SW6 and SW7 are put in the OFF state with the pulses φ1 and φ1d, allowing the voltage accumulated in the capacitor CP1 to be transferred to the gate terminal of the transistor T1. At this time, the switch SW1 is put in the OFF state.

As described above, in the series of operations (1) and (2), the transistors T1 and T2 are in the ON state when the battery device 10 is operating.

(3) Operation During Precharge Period

When the voltage of the charger Vchg is less than the minimum operating voltage of the battery control device 100, e.g., when the voltage VB1 of the secondary battery Vbat has become approximately 0 V, the switch SW3 is turned on. This connects the gate of the transistor T1 to the charger Vchg, permitting the transistor T1 to turn on. The voltage VB1 of the secondary battery Vbat is gradually charged with the voltage VB2 of the charger Vchg via the ON transistor T1 and the body diode of the transistor T2.

(4) Operation During Period when Transistors T1 and T2 are Turned Off (Period when Operation of Battery Device 10 is Stopped)

When the charger Vchg is not driven, such as when the secondary battery Vbat has become its fully charged state by being charged by the charger Vchg and when a voltage large enough for the secondary battery Vbat to drive the drive load RL has been lost during the time when the battery device 10 is driving the drive load RL, the switch SW1 of the switch section 101 and the switch SW2 of the switch section 102 are turned on to turn off the transistors T1 and T2.

By the series of operations described above, with only the level shift circuit AMP3 operating in the level shift section 106, the power consumption of the battery device 10 can be further reduced. Also, the circuit area of the level shift section 106 can be reduced.

Third Embodiment

Figure 3:
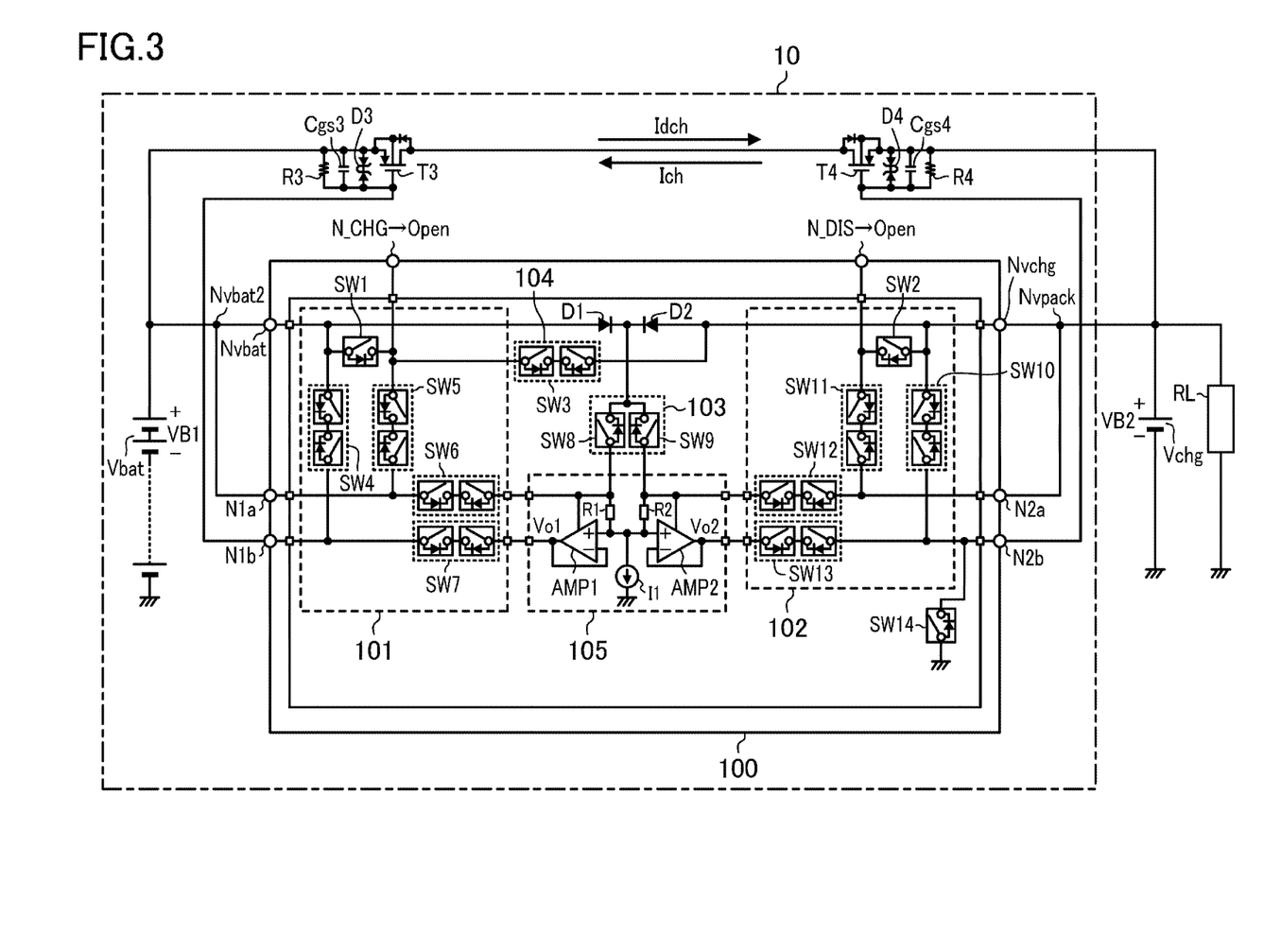
FIG. 3 is a block diagram showing a configuration of a battery device of the third embodiment.

FIG. 3 is a block diagram showing a configuration of a battery device of the third embodiment. Note that the reference characters used in common in the first and third embodiments denote the same components.

The battery device 10 includes: a first high-voltage PMOS transistor T3 (hereinafter referred to as a transistor T3); a second high-voltage PMOS transistor T4 (hereinafter referred to as a transistor T4); the secondary battery Vbat having a voltage value of VB1; the charger Vchg having a voltage value of VB2; and the battery control device 100.

The transistor T3, connected between the secondary battery Vbat and the charger Vchg, operates when the drive load RL is driven, and controls the conduction of the current path from the secondary battery Vbat to the drive load RL. The transistor T4, connected between the secondary battery Vbat and the charger Vchg, operates when the secondary battery is charged, and controls the conduction of the current path from the charger Vchg to the secondary battery Vbat.

The resistance element R3 for discharging the gate voltage is connected between the gate and source of the transistor T3. The resistance element R4 for discharging the gate voltage is connected between the gate and source of the transistor T4. A parasitic capacitance Cgs3 is present between the gate and source of the transistor T3, and a parasitic capacitance Cgs4 is present between the gate and source of the transistor T4. The Diodes D3 and D4 are respectively provided for protecting the gates of the transistors T3 and T4 from a transient large current.

In the battery control device 100, the terminal N1a is connected to the secondary battery via a terminal Nvbat2 that is connected to the terminal Nvbat. The terminal N1b is connected to the gate of the transistor T3. The terminal N2a is connected to the charger Vchg and the drive load RL via a terminal Nvpack that is connected to the terminal Nvchg. The terminal N2b is connected to the gate of the transistor T4. The terminals N_CHG and N_DIS are open.

The switch section 101 performs switching operation for boosting the gate voltage of the transistor T3 when a discharge current is supplied from the secondary battery Vbat to the drive load RL to drive the drive load RL.

The switch section 102 performs switching operation for boosting the gate voltage of the transistor T4 when the secondary battery Vbat is charged by the charger Vchg.

The switch section 103 supplies the power supply voltage to the level shift section 105 that generates voltages required to give predetermined voltages to the gate terminals of the transistors T3 and T4.

The switch section 104 is a switch for short-circuiting the terminal Nvbat and the terminal Nvchg without via the diodes D1 and D2.

Note that the switch SW14 is conduction-controlled so that the gate terminal of the transistor T4 be grounded when the battery device 10 performs its operation in the precharge period to be described later.

As described above, the internal configuration of the battery control device 100 in FIG. 3 is the same as that of the battery control device 100 shown in FIG. 1 except that the pulse generator 120 and the pulses φ1, φ1d, φ2, and φ2d are omitted.

The operation of the secondary battery device 10 where the high-power PMOS switch transistors are used will be described hereinafter.

(1) Operation During Period when Predetermined Voltages are Supplied to Gates of Transistors T3 and T4

When the secondary battery Vbat is charged with the charge current Ich from the charger Vchg and when the drive load RL is driven with the discharge current Idch from the secondary battery Vbat, the switches SW4, SW6, and SW7 of the switch section 101 and the switches SW10, SW12, and SW13 of the switch section 102 perform switching operation, but the switches SW1, SW5, SW2, SW11, and SW3 are kept in the OFF state at all times.

In order to turn on the transistors T3 and T4, the gate voltages of the transistors T3 and T4 must be reduced by their threshold voltages Vtp3 and Vtp4, respectively, with reference to the voltages at their source terminals. Note herein that, in order to connect the source terminal of the transistor T3 to the secondary battery Vbat and the source terminal of the transistor T4 to the charger Vchg, the switches SW1, SW5, SW2, and SW11 are set to the OFF state at all times, and the switches SW4 and SW10 are set to the OFF state.

Meanwhile, the power supply voltage is supplied to the level shift circuits AMP1 and AMP2 of the level shift section 105 from the secondary battery Vbat or the charger Vchg. At this time, with reference to the voltages VB1 and VB2 of the secondary battery Vbat and the charger Vchg, the output voltage Vo1 of the level shift circuit AMP1 and the output voltage Vo2 of the level shift circuit AMP2 can be represented by $$Vo1 = -(VB1 - R1 \times I) \times Av1/(1+Av1)$$

$$Vo2 = -(VB2 - R2 \times I) \times Av1/(1+Av1)$$

where Av1 is the voltage amplification factor of the level shift circuits AMP1 and AMP2.

The output voltage Vo1 is supplied to the gate terminal of the transistor T3, and the output voltage Vo2 is supplied to the gate terminal of the transistor T4. Thus, the gate-source voltage of the transistor T3 becomes Vo1−VB1, which is equal to or less than the threshold voltage Vtp3, and the gate-source voltage of the transistor T4 becomes Vo2−VB2, which is equal to or less than the threshold voltage Vtp4. Accordingly, the transistors T3 and T4 are turned on.

By the above operation, the secondary battery Vbat of the battery device 10 can be charged with the charge current Ich from the charger Vchg, and the drive load RL can be driven with the discharge current Idch from the secondary battery Vbat.

Note that, during the period when the output voltage Vo1 output from the level shift circuit AMP1 is being supplied to the transistor T3, the level shift circuit AMP2 stops its operation. Similarly, during the period when the output voltage Vo2 output from the level shift circuit AMP2 is being supplied to the transistor T4, the level shift circuit AMP1 stops its operation.

(2) Operation During Period when Gates of Transistors T3 and T4 are Turned Off and Drive of Drive Load RL is Stopped In this period, the gate-source voltages of the transistors T3 and T4 must be made equal to or more than their threshold voltages Vtp3 and Vtp4, that is, the gate and source of each transistor must be made equal in potential.

To achieve the above, the switch SW4 of the switch section 101 and the switch SW10 of the switch section 102 are turned on. This short-circuits the gate and source of each of the transistors T3 and T4, thereby turning off the transistors T3 and T4. Also, the voltages accumulated in the gate terminals of the transistors T3 and T4 are discharged to their source terminals with reliability by the resistance elements R3 and R4 connected to the gate terminals and the gate-source parasitic capacitances Cgs3 and Cgs4, respectively.

(3) Operation During Precharge Period

When the voltage of the charger Vchg is less than the minimum operating voltage of the battery control device 100, e.g., when the voltage VB1 of the secondary battery Vbat has become approximately 0 V, the switch SW14 is turned on to turn on the transistor T4. The voltage VB1 of the secondary battery Vbat is then gradually charged with the voltage VB2 of the charger Vchg via the ON transistor T4 and the body diode of the transistor T3.

(4) Operation During Period when Transistors T3 and T3 are Turned Off

When the charger Vchg is not driven, such as when the secondary battery has become its fully charged state by being charged by the charger Vchg and when a voltage large enough for the secondary battery Vbat to drive the drive load RL has been lost during the time when the battery device 10 is driving the drive load RL, the switch SW1 of the switch section 101 and the switch SW2 of the switch section 102 are turned on to turn off the transistors T3 and T4.

As described above, since PMOS transistors can be used as the transistors for charging/discharging in the battery control device 100 in this embodiment, the battery device 10 has levels of productivity and expandability that have not been previously attained. Also, in this embodiment, since no charge pump capacitors for boosting the PMOS transistors T3 and T4 are necessary and no charge pumping is necessary, reduction in circuit area, as well as further reduction in power consumption, can be achieved.

Figure 4:
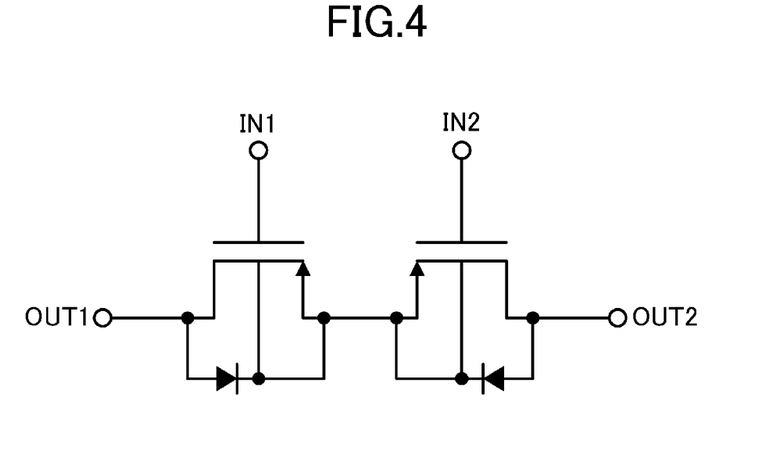
FIG. 4 is a diagram showing an example configuration of a switch section.

Note that, in the embodiments described above, the switches SW1 to SW13 are mere examples, and the switches SW4 to SW7 and the switches SW10 to SW13 may be suitably comprised of p-type MOS transistors as shown in FIG. 4.

The transistors T1 and T2 in the first and second embodiments and the transistors T3 and T4 in the third embodiment may be included inside the battery control device 100, or may be provided outside the battery device 10. The battery control device 100 in each of the embodiments may be suitably comprised of a semiconductor integrated circuit.

In the above embodiments, the secondary battery Vbat may be a battery cell comprised of a plurality of lithium ion secondary batteries, etc. serially connected to each other, for example. The charger Vchg, which is a charger for charging the secondary battery Vbat, for example, may be suitably comprised of an AC/DC converted switching power supply.

In the first and second embodiments, the pulse generator 120 may be included inside the battery control device 100 or provided outside the battery control device 100. Otherwise, the pulse generator 120 may be provided outside the battery device 10. That is, it is only necessary for pulses required for charge pumping to be input into the switch sections 101 and 102.

The battery device according to the present disclosure is useful for power saving of a battery device having a secondary battery comprised of a lithium battery, etc. inside and also for improvement in the productivity and expandability thereof.

What is claimed is:

1. A battery device, comprising:
   a secondary battery configured to supply a current to a load;

a charger configured to charge the secondary battery;
a first NMOS transistor configured to control conduction of a current path from the charger to the secondary battery;
a second NMOS transistor configured to control conduction of a current path from the secondary battery to the load;
a first diode of which an anode is connected to one end of the secondary battery;
a second diode of which an anode is connected to one end of the charger and a cathode is connected to a cathode of the first diode;
a first capacitor configured to accumulate charge to be transferred to a gate of the first NMOS transistor;
a second capacitor configured to accumulate charge to be transferred to a gate of the second NMOS transistor; and
a battery control device configured to control charging/discharging of the secondary battery by controlling the accumulation of charge into the first and second capacitors and the transfer of the charge to the gates of the first and second NMOS transistors,
wherein the battery control device includes:
 a first switch section configured to control whether or not the charge accumulated in the first capacitor be transferred to the gate of the first NMOS transistor,
 a second switch section configured to control whether or not the charge accumulated in the second capacitor be transferred to the gate of the second NMOS transistor,
 a third switch section one end of which is connected between the cathodes of the first and second diodes, and
 a first level shift section having a first level shift circuit connected to the other end of the third switch section and configured to output charge to be accumulated in the first capacitor and a second level shift circuit connected to the other end of the third switch section and configured to output charge to be accumulated in the second capacitor.

2. The battery device of claim 1, wherein
the first level shift section stops operation of the second level shift circuit when the first level shift circuit is charging the first capacitor and the second switch section is transferring the charge accumulated in the second capacitor to the gate of the second NMOS transistor, and
stops operation of the first level shift circuit when the second level shift circuit is charging the second capacitor and the first switch section is transferring the charge accumulated in the first capacitor to the gate of the first NMOS transistor.

3. The battery device of claim 1, wherein the first to third switch sections are comprised of PMOS transistors.

4. A battery device, comprising:
a secondary battery configured to supply a current to a load;
a charger configured to charge the secondary battery;
a first NMOS transistor configured to control conduction of a current path from the charger to the secondary battery;
a second NMOS transistor configured to control conduction of a current path from the secondary battery to the load;
a first diode of which an anode is connected to one end of the secondary battery;
a second diode of which an anode is connected to one end of the charger and a cathode is connected to a cathode of the first diode;
a first capacitor configured to accumulate charge to be transferred to a gate of the first NMOS transistor;
a second capacitor configured to accumulate charge to be transferred to a gate of the second NMOS transistor; and
a battery control device configured to control charging/discharging of the secondary battery by controlling the accumulation of charge into the first and second capacitors and the transfer of the charge to the gates of the first and second NMOS transistors,
wherein the battery control device includes:
 a first switch section configured to control whether or not the charge accumulated in the first capacitor be transferred to the gate of the first NMOS transistor,
 a second switch section configured to control whether or not the charge accumulated in the second capacitor be transferred to the gate of the second NMOS transistor,
 a third switch section one end of which is connected between the cathodes of the first and second diodes, and
 a second level shift section having a third level shift circuit connected to the other end of the third switch section and configured to output charge to be accumulated in the first and second capacitors.

5. The battery device of claim 4, wherein
the battery control device transfers charge accumulated in the second capacitor to the second NMOS transistor when the third level shift circuit is charging the first capacitor, and
transfers charge accumulated in the first capacitor to the first NMOS transistor when the third level shift circuit is charging the second capacitor.

6. The battery device of claim 4, wherein the first to third switch sections are comprised of PMOS transistors.

7. A battery control device, used together with
a first NMOS transistor configured to control conduction of a current path from a charger to a secondary battery,
a second NMOS transistor configured to control conduction of a current path from the secondary battery to a load,
a first capacitor configured to accumulate charge to be transferred to a gate of the first NMOS transistor, and
a second capacitor configured to accumulate charge to be transferred to a gate of the second NMOS transistor, the battery control device comprising:
a first diode of which an anode is connected to one end of the secondary battery; and
a second diode of which an anode is connected to one end of the charger and a cathode is connected to a cathode of the first diode,
wherein the battery control device controls charging/discharging of the secondary battery by controlling the accumulation of charge into the first and second capacitors and the transfer of the charge to the gates of the first and second NMOS transistors, and
the battery control device includes:
 a first switch section configured to control whether or not the charge accumulated in the first capacitor be transferred to the gate of the first NMOS transistor,
 a second switch section configured to control whether or not the charge accumulated in the second capacitor be transferred to the gate of the second NMOS transistor, a third switch section one end of which is connected between the cathodes of the first and second diodes, and a first level shift section having a first level shift circuit connected to the other end of the third switch section and configured to output charge to be accumulated in the first capacitor and a second level shift circuit connected to the other end of the third switch section and configured to output charge to be accumulated in the second capacitor.

\* \* \* \* \*